Aug. 11, 1931.  R. P. THOMPSON  1,818,021
SPACING AND SUPPORTING MEANS
Filed March 26, 1929  2 Sheets-Sheet 1
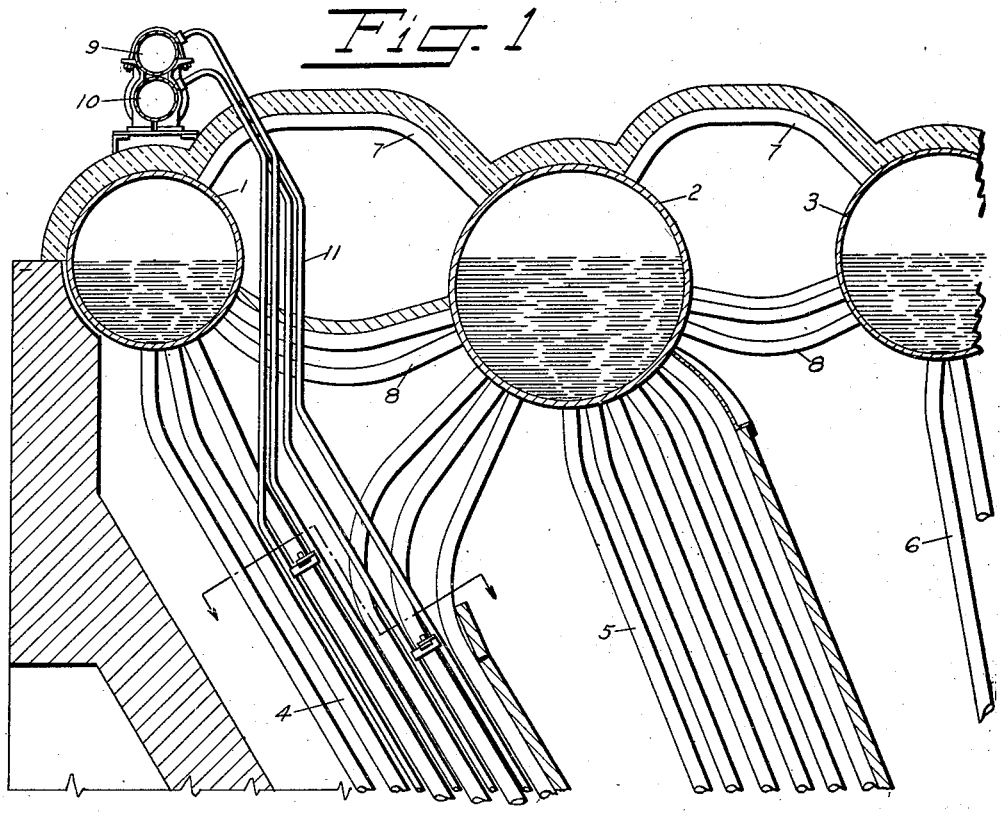
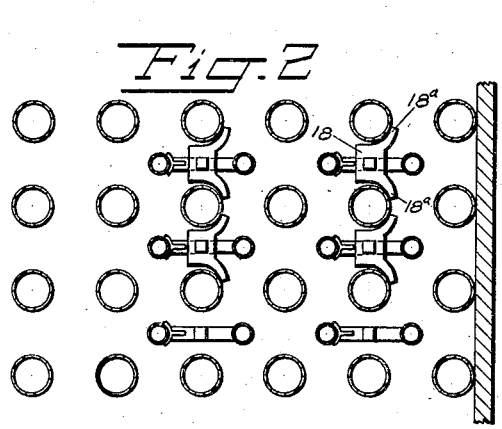
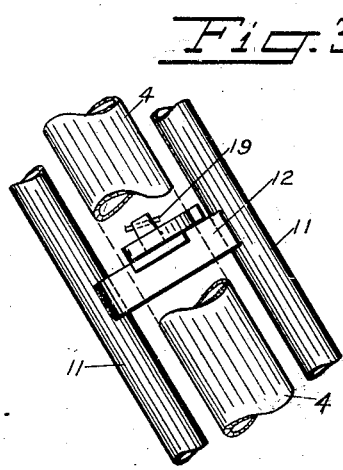
Robert P. Thompson INVENTOR.
BY O. V. Thiele
ATTORNEY.

Aug. 11, 1931.   R. P. THOMPSON   1,818,021
SPACING AND SUPPORTING MEANS
Filed March 26, 1929   2 Sheets-Sheet 2

Robert P. Thompson INVENTOR.
BY O. V. Thiele
ATTORNEY.

Patented Aug. 11, 1931

1,818,021

UNITED STATES PATENT OFFICE

ROBERT P. THOMPSON, OF PIERMONT, NEW YORK, ASSIGNOR TO THE SUPERHEATER COMPANY, OF NEW YORK, N. Y.

SPACING AND SUPPORTING MEANS

Application filed March 26, 1929. Serial No. 349,964.

My invention relates to spacing and supporting means for heating elements and has particular reference to apparatus such as superheaters or the like which are exposed to intense heat.

The principal object of the invention is the provision of a novel form of supporting and spacing element which may be welded in position and which at the same time affords the protection against deterioration secured through the use of special heat-resisting metals which cannot be successfully welded. For a better understanding of the invention and more detailed objects of the invention and the advantages to be derived from its use, reference may be had to the ensuing description of a preferred form of it as applied to a steam superheater, for which use it is particularly adapted, although it is to be understood that the invention is in no way restricted to such specific use.

Figure 4:
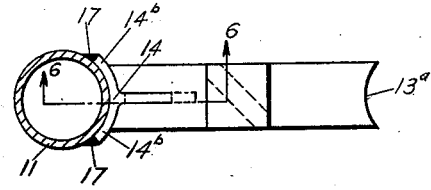
Figure 6:
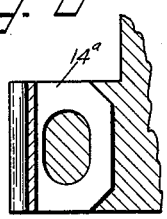
Figure 5:
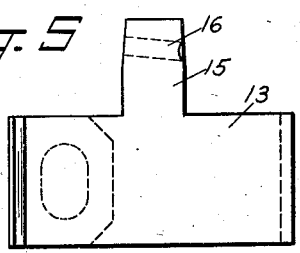
Figure 7:
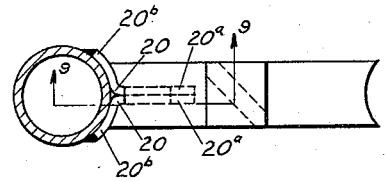
Figure 9:
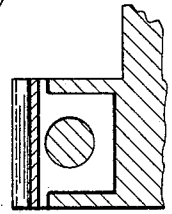
Figure 8:
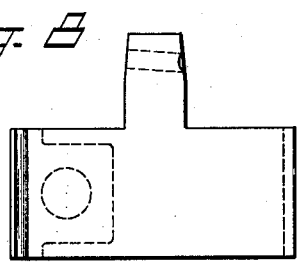

In the accompanying drawings forming a part hereof, Fig. 1 is a fragmentary section of the upper half of a standard semi-vertical boiler equipped with a superheater supported in accordance with this invention; Fig. 2 is a section on an enlarged scale taken on the line 2—2 of Fig. 1; Fig. 3 is a detail of Fig. 1 on a further enlarged scale; Figs. 4 and 5 are plan and elevation views respectively on an enlarged scale of a spacer unit; Fig. 6 is a fragmentary section taken on the line 6—6 of Fig. 4; Figs. 7 and 8 are views similar to Figs. 4 and 5, showing a modified form of spacer unit; and Fig. 9 is a fragmentary section taken on the line 9—9 of Fig. 7.

Referring now to Fig. 1, the boiler shown is of the conventional semi-vertical or Stirling type, comprising steam and water drums 1, 2 and 3 connected by tube banks 4, 5 and 6 to a mud drum not shown and connected to each other by means of the usual steam connections 7 and water circulators 8. The superheater comprises the usual inlet and outlet headers 9 and 10 connected by a plurality of tubular superheating elements 11, the legs of which are generally parallel to the tubes in the bank 4 and located in the intertube space therein. The general location of the superheater elements with respect to the boiler tubes is clearly shown in Fig. 2.

It will be readily apparent that the looped superheater elements, depending from the headers 9 and 10 located at the top of the boiler, require some lateral support in order to hold them in the position shown in Fig. 1, both with respect to each other and with respect to the boiler tubes.

Furthermore, because of the location of the superheater elements in the first pass of the boiler, the means for supporting them must be capable of resisting extreme temperatures. Heretofore, the use of spacers and supports made from special heat-resistant alloys such, for example, as iron or steel containing a relatively high percentage of chromium or like metal having heat resisting properties, has been suggested, but such spacer supports have heretofore proved unsatisfactory due to the lack of suitable means for securing them to the superheater elements.

In accordance with the present invention, the use of such heat-resistant alloys which cannot be welded is made possible through the provision of a bi-metallic spacer, a portion of which is formed of a weldable metal adapted to be secured to a superheater element by welding.

Referring now to Figs. 3 to 6, the spacer 12 comprises a generally rectangular block 13 of heat-resistant, non-weldable metal, into which is cast the longitudinal web 14a of a body weldable metal 14 of generally T-shaped cross-section. The arms 14b forming the transverse web of body 14 are curved to form an arcuate surface adapted to engage the wall of one leg of a superheater element 11 and the opposite face 13a of the spacer is also preferably formed by a concave surface adapted to engage the other leg of the superheater element. The block 13 has an upstanding boss 15 cast thereon through which is bored the diagonally spaced hole 16, the purpose of which will be explained later.

The web 14a is preferably perforated as shown in Figs. 5 and 6 so that when the block 13 is cast around the web, the cast metal on both sides of the web will be joined through the perforation to lock the web securely in position and make of the spacer a substantially integral bi-metallic body. The spacer 12 is secured to a superheater element by means of the welds 17 along the edges of arms 14b, and by reference to Fig. 4 it will be seen that when in position the portion of the spacer formed of weldable metal, which is preferably of mild steel which will not withstand high temperatures without deterioration, is substantially entirely protected from direct contact with the combustion gases by the superheater element 11 and the block 13, which cover substantially the entire face of the transverse arms 14b. The small portion of these arms which is exposed is in direct contact with the superheater element and is effectively cooled by conduction of heat thereto. Further, because of the intimate contact between the tube and the spacer secured through welds 17, the effectiveness of the superheater element as a cooling agent for the spacer is increased. The face 13a of the spacer is preferably left free to slide along the leg of the superheater element with which it is in contact, in order to avoid strains which might be set up by expansion if this face were fixed.

A plate 18, preferably of the same heat-resistant material as the block 13 and having arcuate arm 18a engaging the boiler tubes, rests on top of the spacer 12 and provides lateral support for the spacer and the superheater element to which the spacer is secured. As will be obvious, the plate 18 will be held in position by gravity, but in many instances the steam jets from boiler soot blowers may impinge on the lower side of the plate and in order to prevent its being blown off by such jet, a pin 19 is passed through the hole 16 in the spacer boss to prevent dislodgment of the plate.

Turning now to Figs. 7 to 9, a modified form of spacer is shown, in which the weldable body of metal in the spacer comprises two angle plates 20 having longitudinal webs 20a cast into the body of non-weldable material, and transverse webs 20b forming one face of the spacer. The longitudinal webs 20a may, as shown, be narrower than the block of metal into which they are cast, so that they are protected on all sides from contact with the combustion gases.

The method of assembly of the spacer supports will be readily apparent, the spacer 12 being welded to the superheater element before insertion of the latter in the tube bank. After assembly of the superheater element, the plate 18 is fitted over the boss 15 of the spacer and by engagement with the boiler tubes holds the superheater element in place. The final step in assembly comprises the insertion of the pin 19 in place.

While the invention has been shown as applied to a superheater located in a semi-vertical boiler, it will be quite apparent that the invention is equally well applicable to many other forms of structures of a similar nature and the invention is therefore not to be considered as limited in any sense by the illustrative embodiments herein shown but only by the scope of the appended claims.

I claim:

1. A spacer of the class described comprising a body of weldable metal of substantially T-shaped section, and a block of non-weldable heat-resistant metal cast around the longitudinal web of said body and covering the major portion of one face of the transverse web thereof.

2. A spacer of the class described comprising a body of weldable metal of substantially T-shaped section formed by a pair of angle plates, each having a perforated longitudinal web and an arcuate transverse web, and a block of non-weldable heat-resistant metal cast around the longitudinal webs of said plates and covering the major portion of one face of the transverse webs of said plates.

3. The combination with a pair of substantially parallel tubular elements of weldable metal, of a spacer located between said elements comprising a block of heat-resistant, non-weldable metal, a body of weldable metal having a portion anchored in said block and an exposed portion, and a weld joining said exposed portion with one of said elements.

4. The combination with a pair of substantially parallel tubular elements of weldable metal of a spacer having opposite arcuate faces bearing against said tubes to hold them in spaced relation, one of said spacers being formed by a body of weldable metal anchored in the body of the spacer, and a weld joining one of said tubes with said body of weldable metal.

5. Apparatus of the class described comprising a pair of vertically inclined superheater tubes and a bi-metallic spacer located between the tubes and in contact therewith, the major portion of said spacer being formed of a non-weldable heat-resistant metal, and the face of said spacer in contact with one of said tubes being formed by a body of weldable material metal having a portion cast in the non-weldable metal, and a weld joining said face and tube.

6. Apparatus of the class described comprising a pair of water tubes, a pair of superheater tubes adjacent to said water tubes, a bi-metallic spacer located between said superheater tubes and in contact therewith, the face of said spacer in contact with one of said tubes being formed of metal welded to the tube and metallic means engaging said spacer and said water tubes for holding the superheater tubes relatively fixed with respect to the water tubes.

7. The combination with a pair of spaced vertically inclined water tubes, of a pair of superheater tubes substantially parallel to the water tubes and in a plane substantially at right angles to the plane of the water tubes, a spacer between the superheater tubes having a body of weldable metal anchored therein and welded to one of said tubes, and a metal plate attached to said spacer, said plate having a pair of supporting arms engaging said water tubes to hold the superheater tubes in relatively fixed position with respect to the water tubes.

8. The combination with a pair of spaced vertically inclined water tubes, of a pair of superheater tubes substantially parallel to the water tubes and in a plane substantially at right angles to the plane of the water tubes, a spacer located between the superheater tubes and welded to one of the same, said spacer having an upwardly extending boss thereon, and a perforated plate resting on said spacer around said boss, said plate having a pair of supporting arms engaging said water tubes, and retaining means for preventing dislodgment of said plate.

9. The combination with a pair of spaced vertically inclined water tubes, of a pair of superheater tubes substantially parallel to the water tubes and in a plane substantially at right angles to the plane of the water tubes, a spacer located between the superheater tubes and welded to one of the same, said spacer having an upwardly extending boss thereon, and a perforated plate resting on said spacer around said boss, said plate having a pair of supporting arms engaging said water tubes, and a removable pin passing through said boss above said plate for preventing dislodgment of the latter.

10. A spacer of the class described comprising a body of weldable metal of substantially T-shaped section, and a block of non-weldable heat-resistant metal covering substantially the entire surface of the longitudinal web of said body as well as the major portion of one face of the transverse web thereof, said body and block having interlocked portions whereby they are non-separable and having such close contact that the weldable metal is protected by the non-weldable metal against attack by hot gases of combustion.

ROBERT P. THOMPSON.